Oct. 25, 1966  C. A. SECKERSON ET AL  3,280,436
MOLDING FASTENER
Filed April 15, 1964
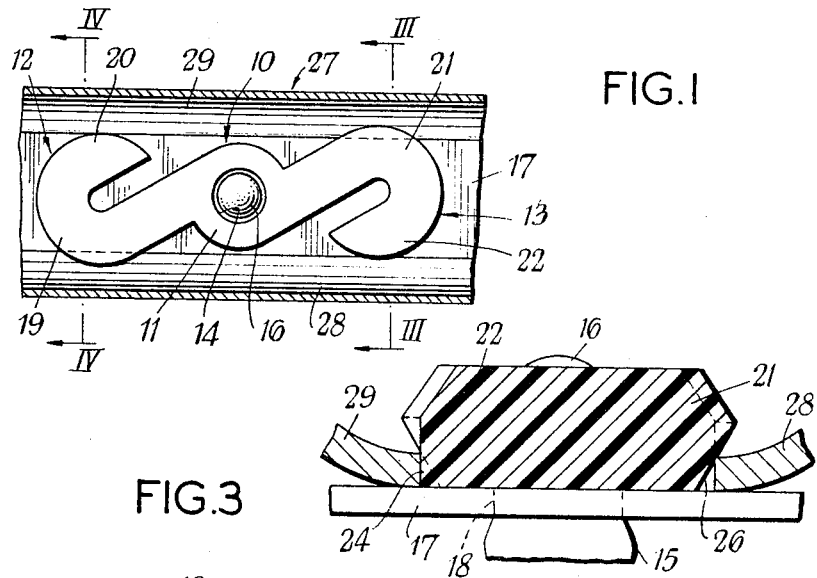
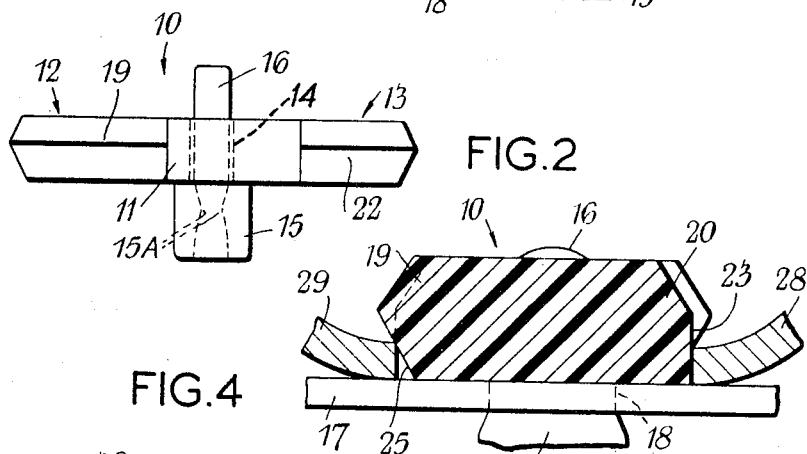
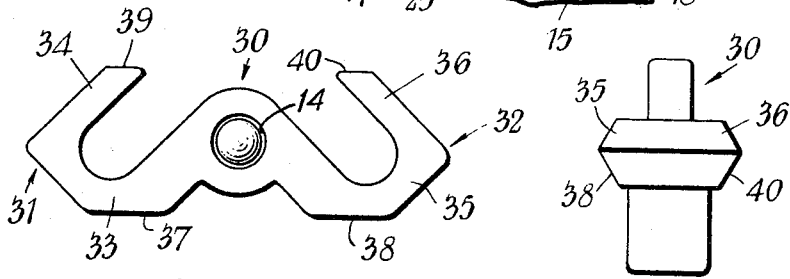
INVENTORS
Clifford Alexander Seckerson
George Montague Mejtso.
by Philip C. Parker
Attorney.

United States Patent Office 3,280,436
Patented Oct. 25, 1966

3,280,436
MOLDING FASTENER
Clifford Alexander Seckerson, Iver Heath, and George Montague Mejlso, Hounslow, Middlesex, England, assignors to United-Carr Incorporated, a corporation of Delaware
Filed Apr. 15, 1964, Ser. No. 360,001
Claims priority, application Great Britain, Apr. 29, 1963, 16,837/63
4 Claims. (Cl. 24—73)

The present invention relates to an improved fastener which is particularly, but not exclusively suitable for attaching strip molding to an apertured support.

According to the invention there is provided a fastener adapted to hold a beading or similar article to an apertured support and comprising a body portion, means thereon for securing the body to the apertured support and two limbs extending from opposite ends of the body, in which each limb is generally of C-shape so as to include two curved limbs one of which is joined to the body and the other of which is free to flex, in which the two arms of each limb extend respectively on opposite sides of the body of the fastener so as to present oppositely facing molding engaging edges, at least one of which edges is undercut, and in which in each limb the freely flexible arm is movable towards the other arm.

According to a further aspect of the invention there is provided an assembly of a member, such as a strip molding, having inturned flanges secured to an apertured support with the aid of a number of fasteners as claimed in claim 1, in which each fastener is engaged in an aperture in the support and the member is held to the support in snap-engagement over the fasteners with one flange held between the support and one of the undercut edges on each fastener and the other flange similarly held between the support and the other undercut edge on each fastener.

Preferred forms of the invention will now be described with reference to the accompanying drawings in which:

FIGURE 1 is a plain view, of a fastener according to the invention, shown attaching a strip molding, drawn in section, to an apertured panel;

FIGURE 2 is a side elevation of the fastener of FIGURE 1;

FIGURES 3 and 4 are sections taken respectively on the lines III–III and IV–IV of FIGURE 1, showing the manner in which the fastener holds the beading on the panel;

FIGURE 5 is a plan view of a further embodiment of the invention; and

FIGURE 6 is an end elevation of the fastener shown in FIGURE 5.

The fastener 10 of FIGURES 1 to 4 is moulded to the shape shown from a suitable material such as a thermosetting or thermoplastic resin and it comprises a body 11, a pair of oppositely extending limbs 12 and 13, and means on the body for attaching the fastener to an apertured support.

A bore 14 is formed in the body 11 and a tubular shank 15, which is formed with an internal protuberance 15A, extends from the undersurface of the body 11 perpendicular to the direction of the limbs 12 and 13.

A pin 16 is located in the bore 14 and is joined to the wall of the bore below the upper surface of the body along a line of weakness, for instance by a number of vanes (not shown).

When the pin 16 is depressed into the body it breaks away at the line of weakness and passes through the protuberance 15A so as to expand the wall of the shank 15 outwardly.

The fastener 10 is attached to a panel 17, as shown in FIGURES 3 and 4, by passing the shank through an aperture 18 in the panel and depressing the pin 16 so that it shears away from the bore, enters the shank and expands it outwardly to secure the fastener firmly to the panel.

The manner in which the shank and pin are operated to attach the fastener to the panel is described in greater detail in Patent No. 3,232,161, dated Feb. 1, 1966.

The two limbs 12 and 13 are each generally of C-shape in plan view and comprise two curved arms 19, 20 and 21, 22 respectively.

The arms 19 and 21 are joined to the body 11 and the arms 20 and 22 will flex resiliently towards the arms 19 and 21 respectively.

The outer side edges 23 and 24 respectively of the arms 20 and 22 are substantially perpendicular to the undersurface of the body, and the outer side edges 25 and 26 of the free arms 19 and 21 are undercut. The undercutting of the outer side of the arms is shown clearly in FIGURES 3 and 4.

The fastener 10 is intended for use in attaching a molding 27 to the panel 17. For this purpose a number of the fasteners 10 are attached in a row of spaced apertures in the panel 17 in the manner described above, with the limbs of each fastener aligned along the row.

The molding 27 has two inwardly directed longitudinal flanges 28 and 29 and, in order to attach the molding over the fasteners, one of the flanges 28 or 29 of the molding is brought up to the row of fasteners and engaged under the undercut side edge of one of the limbs of each fastener. The other flange is then snapped over the fasteners so that it engages tightly under the undercut edge of the other limb of each fastener.

It will be seen that each limb can be compressed slightly and this enables moldings of different, or variable widths to be accommodated and held firmly to the panel by the fastener.

The arm of each limb of the fastener 10 which is joined to the body is undercut and grips a flange of the molding while the free arm of each limb has a side edge which is substantially perpendicular to the undersurface of the body 11. Consequently the grip on the molding is provided by the more rigid arms 19 and 21, the arms 20 and 22 providing little or no resistance to any lift on the molding.

In this way the molding 27 is held firmly to the panel 17 by the undercut side edges of the limbs and there is no risk of any lift on the molding damaging the relatively weak free arms of the limbs.

A modification of the fastener 10 is indicated generally at 30 in FIGURES 5 and 6.

The fastener 30 is similar to the fastener 10 except that it has oppositely extending limbs 31 and 32 generally of C-shape, having curved arms 33, 34 and 35, 36 respectively.

The arms 33 and 35 are each joined to the body of the fastener 30, and the arms 34 and 36 which lie on the same side of the body can be compressed towards the arms 33 and 35.

The side edges 37 and 38 respectively of the arms 33 and 35 are undercut at a relatively acute angle, and the side edges 39 and 40 respectively of the arms 34 and 36 either undercut at a less acute angle, as shown in FIGURE 6, or perpendicular to the major faces of the body In use the fastener 30 is attached in an aperture to a panel and a molding is snap-engaged over it in the manner described with reference to the fastener 10.

The fastener 30 differs from the fastener 10 in that the acutely undercut side edges of the limbs, which provide the grip on the molding, both lie on the same side of the fastener. Consequently one flange of the beading is held more firmly than the other flange, and where the side edges of the free arms 34 and 36 are undercut it is sufficiently shallow an undercut to ensure that the resistance offered against any lift on the molding is not sufficient for the limbs to be damaged or distorted in any way.

The fasteners described herein may be attached to a panel in any suitable manner other than that shown and described. For instance, the body of the fastener may be formed with a through bore, instead of the plunger and stud shown and described, and a conventional metal rivet may be inserted through the bore and the aperture in the panel to attach the fastener thereto.

It will also be seen that the extent of the undercuting of the side edges of the limbs of the fastener may be varied provided that the undercutting on the side edge of the free arm of each limb is not so great that the free arm of the limb can be lifted away from the panel with the molding and thus damaged or distorted.

What we claim is:

1. A fastener adapted to hold a molding or similar article to an apertured support, said fastener comprising a body portion, means thereon for securing said body portion to the apertured support, and two resilient limbs extending from opposite ends of said body portion, each of said limbs being generally of C-shape so as to include two arms, one of which is joined to said body portion and the other of which is free to flex and is spaced from said one arm for a portion of its length, the two arms of each limb extending respectively on opposite sides of said body portion so as to present oppositely facing molding engaging edges, at least one of which is undercut, the arms of each of said limbs being movable toward one another when the molding flanges are pressed over said limbs, as the molding is applied to said support.

2. A fastener as claimed in claim 1, in which the molding engaging edge on the arm of each limb which is joined to the body is undercut towards a major face of the body.

3. A fastener as claimed in claim 2, in which the freely flexible arms of the C-shaped limbs lie on opposite sides of the fastener.

4. An assembly of a member, such as a strip molding, having inturned flanges secured to an apertured support with the aid of a number of fasteners as claimed in claim 1, in which each fastener is engaged in an aperture in the support and the member is held to the support in snap-engagement over the fasteners with one flange held between the support and one of the undercut edges on each fastener and the other flange similarly held between the support and the other undercut edge on each fastener.

References Cited by the Examiner

UNITED STATES PATENTS

| 2,124,252 | 7/1938 | Lavigne. | |
| 2,254,311 | 9/1941 | Place | 52—718 |
| 2,255,858 | 9/1941 | Place | 52—718 |
| 2,563,121 | 8/1951 | Krach | 24—73 |

WILLIAM FELDMAN, *Primary Examiner.*

E. SIMONSEN, *Assistant Examiner.*